|||||||||||||||||||||||||||||||||||||||||||||||||
US010678862B2

(12) United States Patent
Taguchi

(10) Patent No.: US 10,678,862 B2
(45) Date of Patent: Jun. 9, 2020

(54) INFORMATION PROCESSING APPARATUS, METHOD, AND NON-TRANSITORY COMPUTER READABLE MEDIUM FOR SEARCHING BUSINESS PROCESSES AND RELATED DOCUMENTS

(71) Applicant: FUJI XEROX CO., LTD., Tokyo (JP)

(72) Inventor: Ryouji Taguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 163 days.

(21) Appl. No.: 15/496,304

(22) Filed: Apr. 25, 2017

(65) Prior Publication Data

US 2018/0025095 A1    Jan. 25, 2018

(30) Foreign Application Priority Data

Jul. 21, 2016    (JP) .................................. 2016-143216

(51) Int. Cl.
*G06F 16/00* (2019.01)
*G06F 16/903* (2019.01)
*G06Q 10/06* (2012.01)

(52) U.S. Cl.
CPC ..... *G06F 16/90335* (2019.01); *G06Q 10/063* (2013.01)

(58) Field of Classification Search
CPC ........................ G06F 16/90335; G06Q 10/063
See application file for complete search history.

(56) References Cited

U.S. PATENT DOCUMENTS

| 2008/0312992 A1* | 12/2008 | Hoshi ................... G06Q 10/04 705/7.27 |
| 2010/0191701 A1* | 7/2010 | Beyda ................... G06Q 10/06 707/608 |
| 2012/0109708 A1* | 5/2012 | Mueller ............. G06Q 10/0633 705/7.27 |
| 2014/0310054 A1* | 10/2014 | Hernandez, Jr. ... G06Q 10/0633 705/7.27 |

FOREIGN PATENT DOCUMENTS

| JP | 2010-055381 | 3/2010 |
| JP | 2011-08584 A | 1/2011 |
| JP | 2012-243268 A | 12/2012 |

OTHER PUBLICATIONS

Jan. 7, 2020 Office Action issued in Japanese Patent Application 2016-143216.

* cited by examiner

*Primary Examiner* — Dinku W Gebresenbet
(74) *Attorney, Agent, or Firm* — Oliff PLC

(57) ABSTRACT

This application discloses an information processing apparatus that searches for a business process using (i) user-selected one or more task features and (ii) user-selected one or more document features as search conditions, and presents the search result. The user-selected one or more task features are features of tasks in a particular business process, and the user-selected one or more document features are features of documents generated in the tasks of the particular business process.

10 Claims, 14 Drawing Sheets

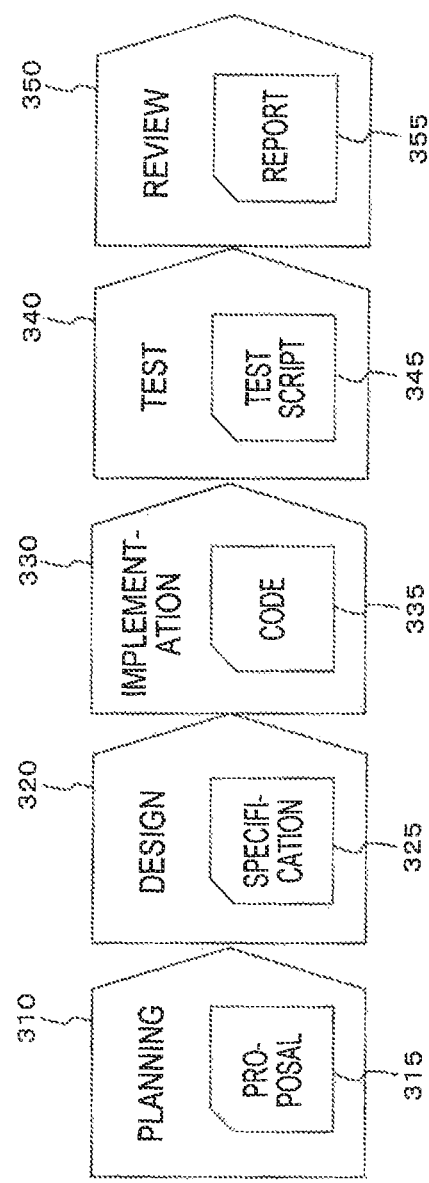

FIG.5

| 510 | 515 | 520 | 525 | 530 | 535 |
|---|---|---|---|---|---|
| PROCESS ID | PROCESS NAME | PERSON IN CHARGE | START DATE | END DATE | STATUS |
|  |  |  |  |  |  |

| 540 | 545 | 550 | 555 | 560 | 565 | 570 | |
|---|---|---|---|---|---|---|---|
| NUMBER OF TASKS | TASK ID | TASK NAME | PERSON IN CHARGE | START DATE | END DATE | OPERATION TIME | ... |
|  |  |  |  |  |  |  |  |

600

| 610 | 615 | 620 |
|---|---|---|
| PROCESS ID | TASK ID | DOCUMENT ID |
|  |  |  |

FIG. 12

| PROCESS 1210 | DESIGN>SPECIFICATION >NUMBER OF PAGES 1220 | IMPLEMENTATION >OPERATION TIME 1230 | TEST>SCRIPT >NUMBER OF ITEMS 1240 | SIMILARITY 1250 |
|---|---|---|---|---|
| PROCESS 1 | 100 PAGES | 40 HOURS | 400 ITEMS | ○ |
| PROCESS 2 | 50 PAGES | 20 HOURS | 200 ITEMS | COMPARISON SOURCE |
| PROCESS 3 | 50 PAGES | 30 HOURS | 50 ITEMS | △ |
| PROCESS 4 | 50 PAGES | 10 HOURS | 300 ITEMS | × |

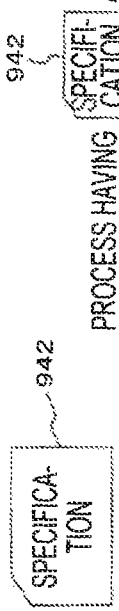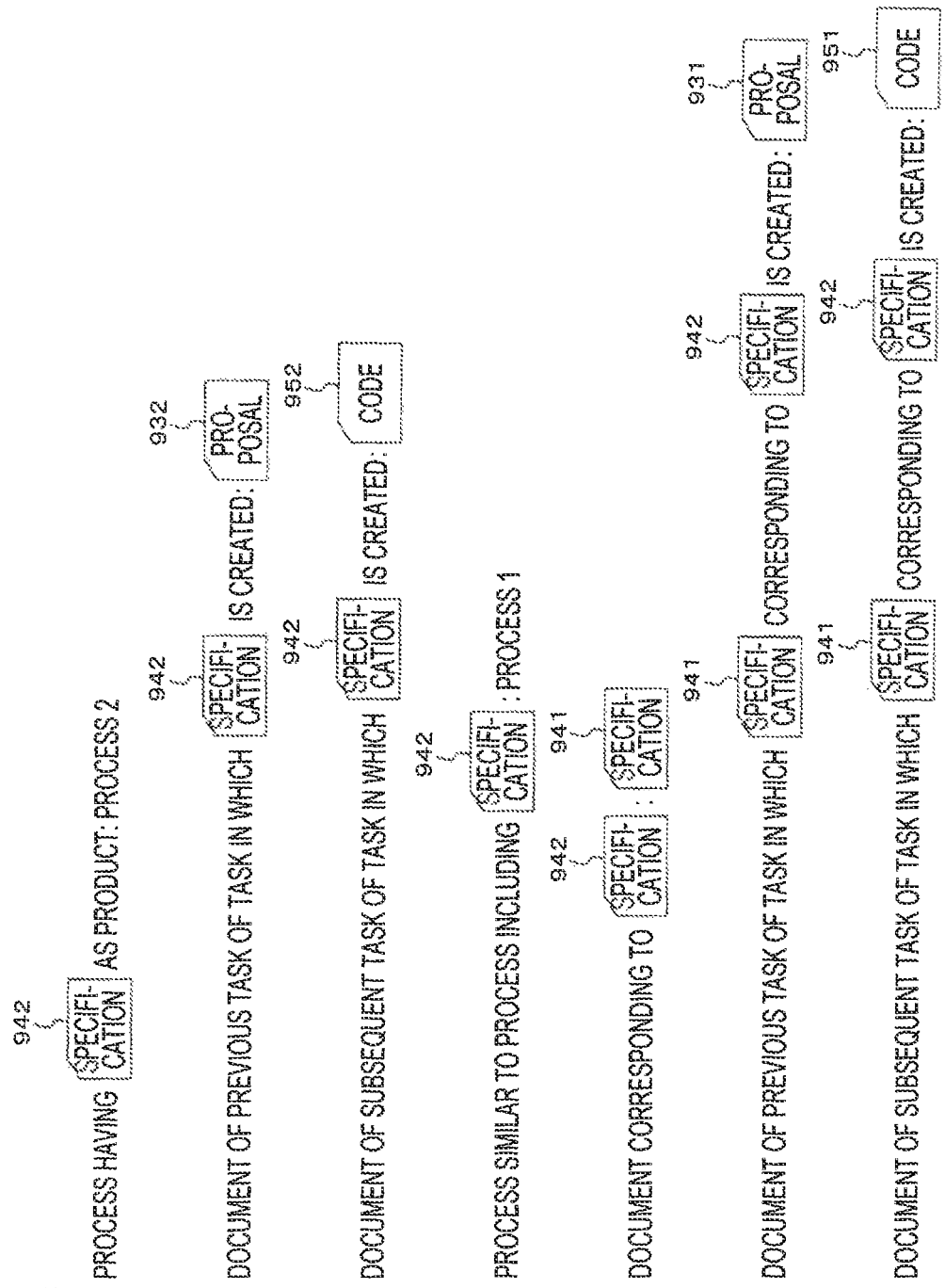

FIG. 15

| PROCESS | PLANNING | DESIGN | IMPLEMENT-ATION | TEST | REVIEW | TEST RESULT | FAILURE AFTER MARKET INTRODUCTION |
|---|---|---|---|---|---|---|---|
| PROCESS 1 | PROPOSAL 1531 | SPECIFICATION 1541 | CODE 1551 | SCRIPT 1561 | REPORT 1571 | TEST RESULT 1581 | DEFECT REPORT 1591 |
| PROCESS 2 | PROPOSAL 1532 | SPECIFICATION 1542 | CODE 1552 | SCRIPT 1562 | REPORT 1572 | TEST RESULT 1582 | DEFECT REPORT 1592 |
| PROCESS 3 | PROPOSAL 1533 | SPECIFICATION 1543 | CODE 1553 | SCRIPT 1563 | REPORT 1573 | TEST RESULT 1583 | DEFECT REPORT 1593 |
| PROCESS 4 | PROPOSAL 1534 | SPECIFICATION 1544 | CODE 1554 | SCRIPT 1564 | REPORT 1574 | TEST RESULT 1584 | DEFECT REPORT 1594 |

INFORMATION PROCESSING APPARATUS, METHOD, AND NON-TRANSITORY COMPUTER READABLE MEDIUM FOR SEARCHING BUSINESS PROCESSES AND RELATED DOCUMENTS

CROSS-REFERENCE TO RELATED APPLICATIONS

This application is based on and claims priority under 35 USC 119 from Japanese Patent Application No. 2016-143216 filed Jul. 21, 2016.

BACKGROUND

Technical Field

The present invention relates to an information processing apparatus, an information processing method, and a non-transitory computer readable medium.

SUMMARY

According to an aspect of the invention, an information processing apparatus includes:

a search unit that searches for a business process using (i) task features that are features in tasks of a business process and (ii) document features that are features of documents generated in the tasks, as search conditions; and a first presentation unit that presents a search result.

BRIEF DESCRIPTION OF THE DRAWINGS

Exemplary embodiments of the present invention will be described in detail based on the following figures, wherein:

FIG. 3 is an explanatory view illustrating an example of a business process;

FIG. 4 is an explanatory view illustrating an example of a data structure of a document table;

FIG. 5 is an explanatory view illustrating an example of a data structure of a process table;

FIG. 6 is an explanatory view illustrating an example of a data structure of a process and document relationship table;

FIG. 12 is an explanatory view illustrating a processing example according to the exemplary embodiment;

FIGS. 14A and 14B are explanatory views each illustrating a processing example according to the exemplary embodiment;

FIG. 15 is an explanatory view illustrating a processing example according to the exemplary embodiment;

DETAILED DESCRIPTION

Hereinafter, an exemplary embodiment of the present invention will be described with reference to the accompanying drawings.

Figure 1:
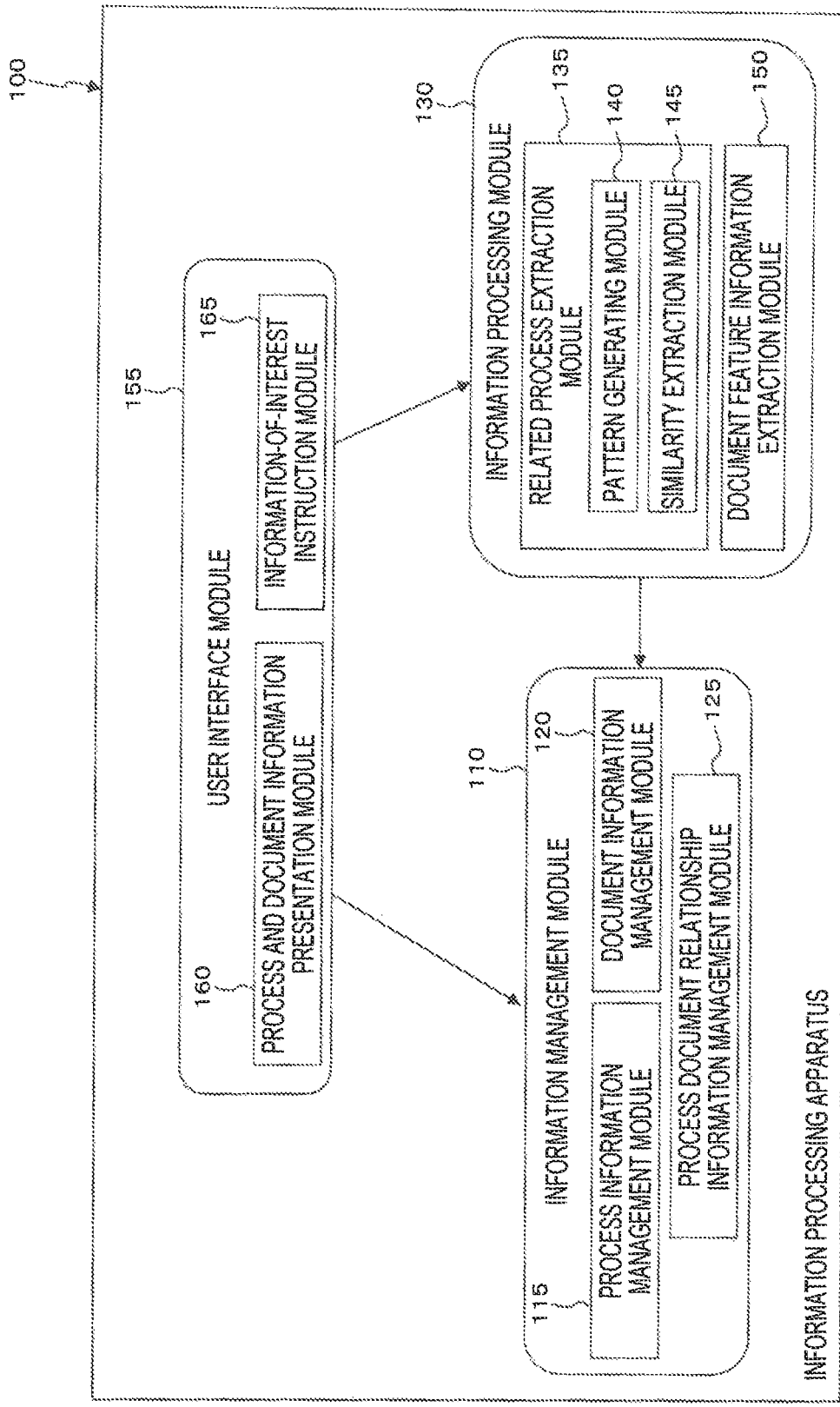
FIG. 1 is a conceptual module configuration diagram of a configuration example of an exemplary embodiment.

FIG. 1 illustrates a conceptual module configuration diagram of a configuration example of the exemplary embodiment.

The term "module" generally refers to a component such as software (computer program) or hardware that may be logically separated. Accordingly, the module in the exemplary embodiment indicates not only a module in a computer program, but also a module in a hardware configuration. Therefore, the description for the exemplary embodiment also includes the description on a computer program (a program causing a computer to execute each sequence, a program causing a computer to serve as each unit, or a program causing a computer to implement each function), a system, and a method which may be functioned as the modules. Meanwhile, for the sake of convenience of explanation, "store," "cause to store" and statements equivalent thereto are used. It should be noted that these statements indicate that something is stored in a storage device or the storage device is controlled to store something when the exemplary embodiment is implemented by a computer program. Although a module and a function have a 1:1 correspondence, in the implementation, one module may be configured by one program, plural modules may be configured by one program, and conversely, one module may be configured by plural programs. Plural modules may be executed by one computer, or one module may be executed by plural computers in the case of computers in a distributed or parallel environment. One module may include another module. Hereinafter, the term "connection" is used not only for a physical connection, but also for a logical connection (data exchange, instruction, reference relation between data or the like). The term "predetermined" indicates that something is determined prior to a target processing, and further indicates that not only before a process according to the exemplary embodiment starts, but also before the target processing is performed even after the process according to the exemplary embodiment starts, something is determined according to a situation/state at that time, or a situation/state until then. When there exist plural "predetermined values," the values may be different from each other or two or more values (of course, including all values) may be the same. The statement "to carry out B when it is determined to be A" indicates that "it is determined whether something is A, and when it is determined that something is A, B is carried out." It should be noted that some cases where it needs not to determine whether something is A are excluded.

A system or an apparatus may be implemented by a configuration of plural computers, hardware, apparatuses and the like connected via a communication unit such as a network (including 1:1 correspondence communication connection) or may be implemented by a single computer, hardware, an apparatus and the like. The terms "apparatus" and "system" are used as synonymous terms. Of course, the term "system" does not include something that is merely a social "mechanism" (social system) which is an artificial arrangement.

For each processing performed by each module, or for each of plural processings when the processings are performed in a module, target information is read from a storage device, and after the processing is performed, the processing result is recorded in the storage device. Accordingly, descriptions on reading from the storage device before the processing, and recording in the storage device after the processing may be omitted. The storage device used herein may include a hard disk, a random access memory (RAM), an external storage medium, a storage device via a communication line, a register within a central processing unit (CPU) and the like.

The information processing apparatus 100 according to the exemplary embodiment manages documents as business products in association with a structure of a business process, and includes an information management module 110, an information processing module 130, and a user interface module 155 as illustrated in the example of FIG. 1. The business process indicates a series of activities performed to achieve an object of management such as selling products and providing services.

The information processing apparatus 100 extracts a similar process (an instance of a business process) using (i) task features that are features (also referred to as indices) in tasks of a business process and (ii) document features that are features of documents generated in the tasks, as search conditions.

In carrying out business, it may be desired to refer to information of similar processes performed in the past. Also, it may be desired to find a process that tends to lead to bad results using a process group having bad results or a process group having good results.

In such a case, it may be desired to extract similar tasks using (i) features of tasks in a process and (ii) features extracted from documents associated with individual tasks of the process.

It may be desired to extract a process that is similar to a target process in a relationship between a feature of a specific document of a previous task and a feature of a specific document of a subsequent task. In this case, the feature of the document of the previous task and the feature of the document of the subsequent task may not be necessarily the same type of features.

For example, in a software development business, processes which are similar to each other in a relationship between a specification volume in a design task, an implementation amount in an implementation task, and a test amount in a test task may tend to have similar qualities. In this case, it is necessary to perform a search focusing on features such as the number of pages of a specification as an index of the specification volume, the elapsed time of the implementation task as an index of the implementation amount, and the number of items of a test script as an index of the test amount.

The information processing apparatus 100 deals with these.

The information management module 110 includes a process information management module 115, a document information management module 120, and a process document relationship information management module 125, and is connected to the information processing module 130, and the user interface module 155. The information management module 110 stores information related to business processes, and information related to documents (including documents themselves).

The document information management module 120 stores information related to documents, for example, a document table 400. FIG. 4 is an explanatory view illustrating an example of a data structure of the document table 400. The document table 400 includes a document ID column 410, a document name column 415, a creator column 420, a creation date/time column 425, a storage location column 430, a document type column 435, a number of pages column 440, a number of steps column 445, a number of items column 450 and the like. The document ID column 410 stores information (document ID: IDentification) for uniquely identifying a document in the exemplary embodiment. The document name column 415 stores a document name of the document. The creator column 420 stores a creator of the document. The creation date/time column 425 stores a creation date and time of the document (year, month, day, hour, minute, second, subsecond, or a combination thereof). The storage location column 430 stores a storage location of the document such as a uniform resource locator (URL) or the like. The storage location column 430 may store data of the document itself. The document type column 435 stores a document type of the document (e.g., a proposal, a specification, a program code (hereinafter, also simply referred to as a code), a test script, a report and the like). The number of pages column 440 stores the number of pages of the document. The number of steps column 445 stores the number of steps when the document is a program code. The number of items column 450 stores the number of items within the document.

The process information management module 115 stores information related to business processes such as a process table 500. FIG. 5 is an explanatory view illustrating an example of a data structure of the process table 500. The process table 500 includes a process ID column 510, a process name column 515, a person in charge column 520, a start date column 525, an end date column 530, a status column 535, a number of tasks column 540, a task ID column 545, a task name column 550, a person in charge column 555, a start date column 560, an end date column 565, and an operation time column 570. The process ID column 510 stores information (process ID) for uniquely identifying a process in the exemplary embodiment. The process name column 515 stores a process name of the process. The person in charge column 520 stores a person in charge of the process. The start date column 525 stores a start date of the process. The end date column 530 stores an end date of the process. The status column 535 stores a status of the process. The number of tasks column 540 stores the number of tasks in the process. The number of tasks corresponds to the number of sets in a range from the task ID column 545 to the operation time column 570, following the number of tasks column 540. The task ID column 545 stores information (task ID) for uniquely identifying a task in the exemplary embodiment. The task name column 550 stores a task name of the task. The person in charge column 555 stores a person in charge of the task. The start date column 560 stores a start date of the task. The end date column 565 stores an end date of the task. The operation time column 570 stores an operation time of the task.

The process document relationship information management module 125 stores information related to association between a business process and a document, for example, a process and document relationship table 600. FIG. 6 is an explanatory view illustrating an example of a data structure of the process and document relationship table 600. The process and document relationship table 600 includes a process ID column 610, a task ID column 615, and a document ID column 620. The process ID column 610 stores a process ID. The task ID column 615 stores a task ID of a task in the process. The document ID column 620 stores a document ID of a document generated in the task. The term "document generated in a task" refers to a document created during a task, and is also called a product. The document is generally created in the period from the start date to the end date of the task. It should be noted that the document may be created before the start date or after the end date. The document only has to be associated by the process and document relationship table 600.

The information processing module 130 includes a related process extraction module 135, and a document feature information extraction module 150, and is connected to the information management module 110, and the user interface module 155. The information processing module 130 searches for a process, a document, or a combination of a process and a document according to an instruction accepted by an information-of-interest instruction module 165.

The information processing module 130 may extract a business process whose evaluation falls within a predetermined range, from a document generated in a business process evaluation task.

The related process extraction module 135 includes a pattern generating module 140, and a similarity extraction module 145. The related process extraction module 135 searches for a business process using (i) task features that are features of tasks in a business process and (ii) document features that are features of documents generated in the tasks, as search conditions.

The pattern generating module 140 generates a pattern in which task features and document features are arranged in a task order. That is, the pattern generating module 140 generates a pattern of a change of values of features specified by the information-of-interest instruction module 165. Specifically, the pattern generating module 140 extracts values of the specified features and extracts a transition pattern according to the task order. This will be described below using the example of FIG. 11.

The similarity extraction module 145 calculates a similarity between patterns generated by the pattern generating module 140. For example, the similarity extraction module 145 may perform search by comparing a pattern in which task features and document features as search conditions are arranged in the task order to a pattern in which task features and document features of a business process as a search target are arranged in the task order. Specifically, the similarity extraction module 145 extracts a process having a pattern similar to the pattern of the process specified by the information-of-interest instruction module 165.

The document feature information extraction module 150 extracts features of a document. The document is generated in each task of a business process. Here, the document (also, referred to as a file) refers to text data, numerical data, graphic data, image data, moving image data, audio data or a combination thereof, which may be a target of storage, editing, search, or the like, and may be exchanged as an individual unit between systems or users, and also includes items similar to the data. Specifically, the document includes a document created by a document creation program, an image read by an image reading device (e.g., a scanner), a web page, or the like. For example, the document corresponds to a proposal 315, a specification 325, a code 335, a test script 345, a report 355, and the like to be described below with reference to FIG. 3. Features of the document are extracted from a body of the document and attributes (a document name, a document type, a creation date, a creator, a size, a number of pages, an approval state, an item, etc.) of the document.

For example, the document feature information extraction module 150 extracts features such as a document name, a document type, a size, a number of pages, and an approval state, from individual documents related to a task of a business process. The document feature information extraction module 150 extracts features such as the number of documents and a combination of document types, from a document group related to a specific task. The task in which the document is generated may be included as a feature. Accordingly, the previous task or the subsequent task in which the document is generated is also included in the feature.

The document feature information extraction module 150 may be configured to be dynamically incorporated (plugged in). For example, when a document managed by another information processing apparatus X is set as a processing target, the document feature information extraction module 150 may be incorporated in the information processing apparatus X. Accordingly, it is possible to extract necessary information later.

As described above, the features of the document are extracted automatically by the document feature information extraction module 150, so that entry omission is eliminated.

The user interface module 155 includes a process and document information presentation module 160, and the information-of-interest instruction module 165, and is connected to the information management module 110 and the information processing module 130. The user interface module 155 performs processings related to a user interface in the information processing apparatus 100. For example, tasks and features of interest are specified for each of the individual tasks. The feature of interest includes a task feature and a document feature, and serves as search conditions. Here, an arbitrary number of tasks of interest may be specified. Features of interest may be specified for each of the individual tasks. Accordingly, it is possible to extract a similar process based on a pattern of a relationship between values of arbitrary features that the user thinks relevant.

The process and document information presentation module 160 presents search results obtained by the information processing module 130.

The process and document information presentation module 160 may issue a warning when task features and document features of a business process as a target are similar to task features and document features of a business process extracted by the information processing module 130.

The process and document information presentation module 160 presents task features and document features of a process such that the user can select the features Specifically, this will be described using the example of FIG. 10.

The information-of-interest instruction module 165 accepts task features and document features selected from one business process. This accepting may accept, for example, a user selection operation or accept task features and document features which are previously selected.

In this case, the information processing module 130 may set the task features and the document features accepted by the information-of-interest instruction module 165 as search conditions.

The information-of-interest instruction module 165 may accept a selected document. This accepting, for example, may accept a user selection operation or accept a previously selected document.

In this case, the information processing module 130 may set (i) task features in tasks of a business process in which the documents accepted by the information-of-interest instruction module 165 is generated and (ii) document features of the documents, as search conditions.

Figure 2:
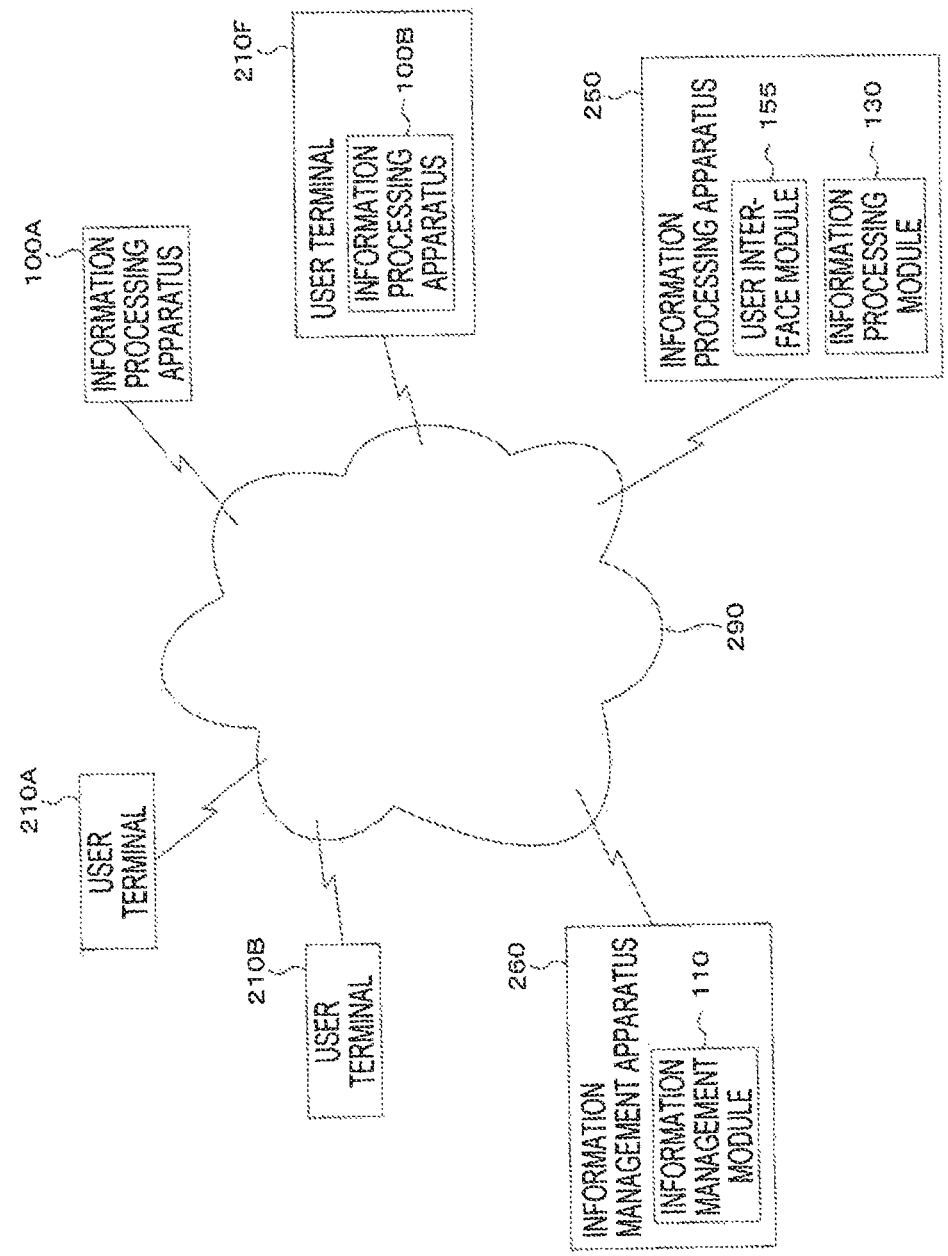
FIG. 2 is an explanatory view illustrating a configuration example of a system according to the exemplary embodiment.

FIG. 2 is an explanatory view illustrating a configuration example of a system according to the exemplary embodiment.

An information processing apparatus 100A, a user terminal 210A, a user terminal 210B, a user terminal 210F, an information processing apparatus 250, and an information management apparatus 260 are connected to each other via a communication line 290. The communication line 290 may be a wireless line, a wired line, or a combination thereof, and may be, for example, the Internet as a communication infrastructure, an intranet or the like. The function by the information processing apparatus 100 may be implemented as a cloud service.

For example, the user terminal 210A, and the user terminal 210B may use the information processing apparatus 100A via the communication line 290. In this case, the presentation by the process and document information presentation module 160 corresponds to, for example, generation and transmission of a web page. The accepting by the information-of-interest instruction module 165 may correspond to, for example, acceptance and reception of an operation on a web page.

The user terminal 210F includes an information processing apparatus 100B. In this case, the user terminal 210F may be used as a stand alone terminal.

Modules within the information processing apparatus 100 may be configured in a distributed manner. For example, the information processing apparatus 250 includes the information processing module 130, and the user interface module 155, and the information management apparatus 260 includes the information management module 110. The information processing apparatus 250 uses the information management module 110 in the information management apparatus 260 via the communication line 290.

FIG. 3 is an explanatory view illustrating an example of a business process. As a business process, a process of a software development business is exemplified, and a structure of a task and a related document (product) in the process of the software development business is illustrated.

The business process includes a planning 310, a design 320, an implementation 330, a test 340, and a review 350, and an operation is performed in this order.

In the planning 310, the proposal 315 is created as a related document, in the design 320, the specification 325 is created as a related document, in the implementation 330, the code 335 is created as a related document, in the test 340, the test script 345 is created as a related document, and in the review 350, the report 355 is created as a related document.

In this example, one task is associated with one document. Alternatively, one task may be associated with plural documents.

Tasks may be hierarchized. The business process may include three tasks, such as an estimation task, a procurement task, and a delivery task, and the procurement task may be further divided into an ordering task and a processing task.

Figure 7:
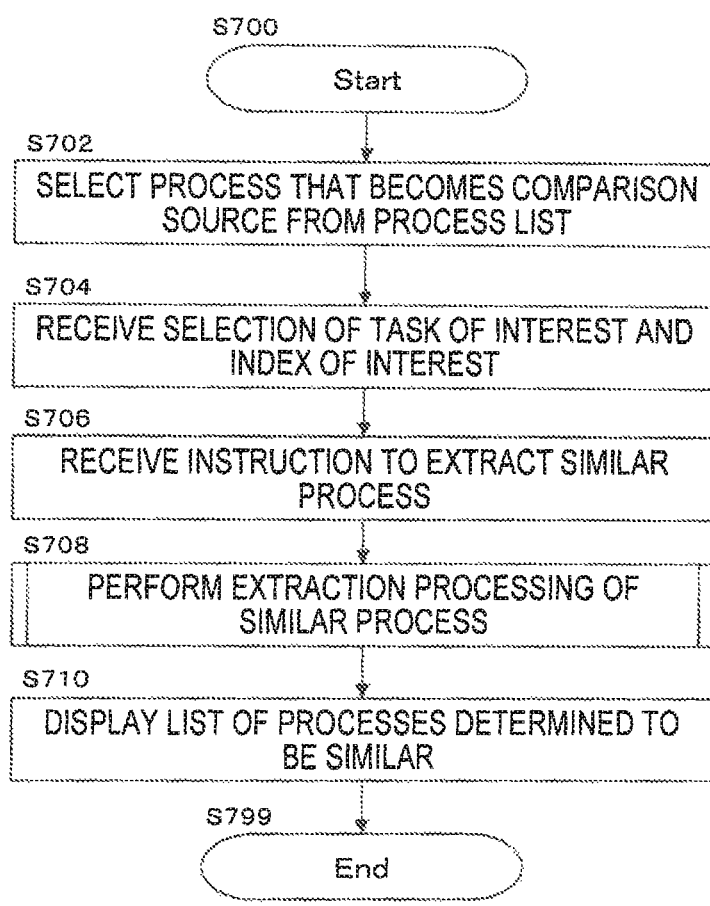
FIG. 7 is a flowchart illustrating a processing example according to the exemplary embodiment.

FIG. 7 is a flowchart illustrating a processing example according to the exemplary embodiment.

In step S702, a process that becomes a comparison source is selected from a process list.

Figure 9:
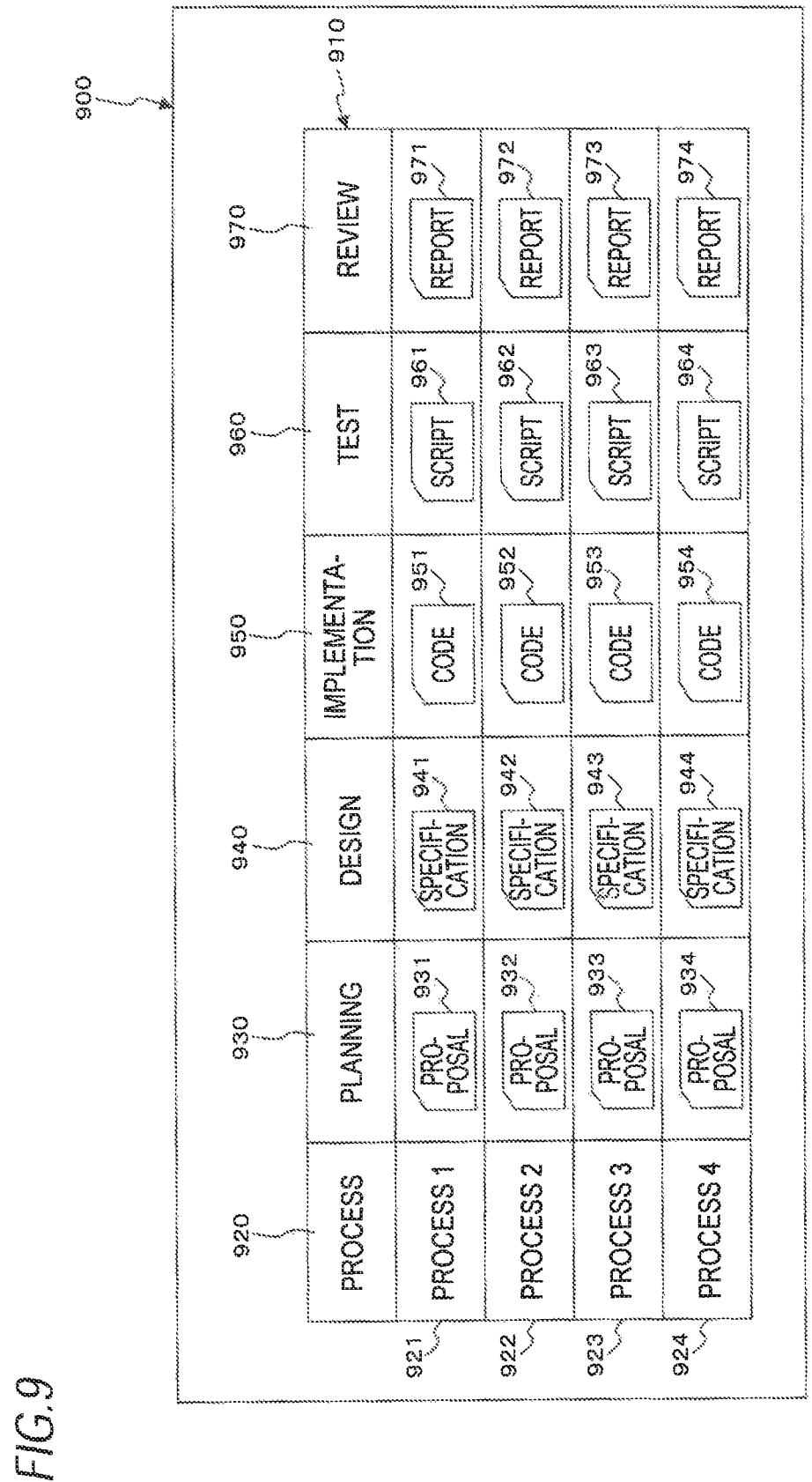
FIG. 9 is an explanatory view illustrating a processing example according to the exemplary embodiment.

As the process list, for example, as in a screen 900 illustrated in FIG. 9, a process list 910 is presented. The process list 910 includes a "planning" task column 930, a "design" task column 940, an "implementation" task column 950, a "test" task column 960, and a "review" task column 970, corresponding to the process illustrated in the example of FIG. 3, for each process column 920 (four processes, that is, a process 1:921, a process 2:922, a process 3:923, and a process 4:924). For example, the process 1:921 indicates a relationship between a proposal 931 in the "planning" task column 930, a specification 941 in the "design" task column 940, a code 951 in the "implementation" task column 950, a script 961 in the "test" task column 960, and a report 971 in the "review" task column 970.

Here, it is assumed that the process 2:922 is selected by an operation of the user.

In step S704, selection of a task of interest and an index of interest is received.

Figure 10:
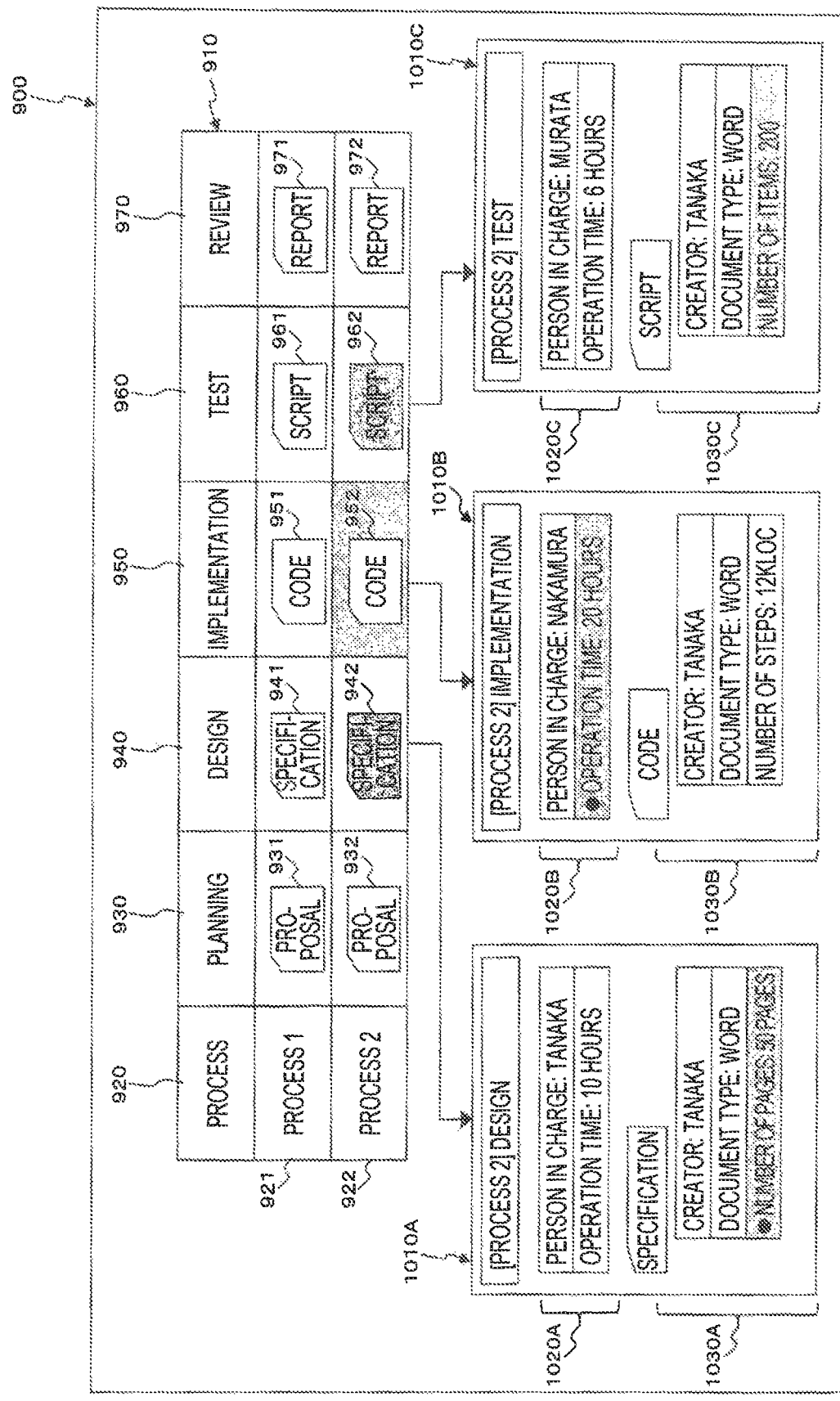
FIG. 10 is an explanatory view illustrating a processing example according to the exemplary embodiment.

For example, when the process 2:922 is selected, as in the screen 900 illustrated in FIG. 10, an index-of-interest instruction area 1010 is presented. FIG. 10 is an explanatory view illustrating a processing example according to the exemplary embodiment. In a related art, it is necessary to define information as an index used for evaluation in advance as attribute information of a business process, and to input the value for each process. However, information in which a user has an interest is not always known in advance. The information processing apparatus 100 makes presentation as illustrated in the example of FIG. 10, and enables the user to select task features and document features.

In the screen 900, the process list 910, an index-of-interest instruction area 1010A, an index-of-interest instruction area 1010B, and an index-of-interest instruction area 1010C are presented. The index-of-interest instruction area 1010 includes a work task index display area 1020, and a related document index display area 1030.

For example, in the work task index display area 1020A of the index-of-interest instruction area 1010A, "person in charge: Tanaka," and "operation time: 10 hours" are presented, and in the related document index display area 1030A, for "specification" as the related document, "creator: Tanaka," "document type: Word," and "number of pages: 50 pages" are presented.

In the work task index display area 1020B of the index-of-interest instruction area 1010B, "person in charge: Nakamura," and "operation time: 20 hours" are presented, and in the related document index display area 1030B, for "code" as the related document, "creator: Tanaka," "document type: Word," and "number of steps: 12KLOC" are presented.

In the work task index display area 1020C of the index-of-interest instruction area 1010C, "person in charge: Murata," and "operation time: 6 hours" are presented, and in the related document index display area 1030C, for "script" as the related document, "creator: Tanaka," and "document type: Word," "number of items: 200" are presented.

The drawing illustrates that "number of pages: 50 pages" in the related document index display area 1030A of the index-of-interest instruction area 1010A, "operation time: 20 hours" in the work task index display area 1020B of the index-of-interest instruction area 1010B, and "number of items: 200" in the related document index display area 1030C of the index-of-interest instruction area 1010C are selected by the operation of the user. That is, a combination of features of a task and a document is selected.

In step S706, an instruction to extract a similar process is received.

This corresponds to a case where, for example, an "extract" button is presented on the screen 900, and the "extract" button is selected by the user operation.

In step S708, an extraction processing of a similar process is performed. Details of the processing in step S708 will be described using the flowchart illustrated in the example of FIG. 8.

Figure 8:
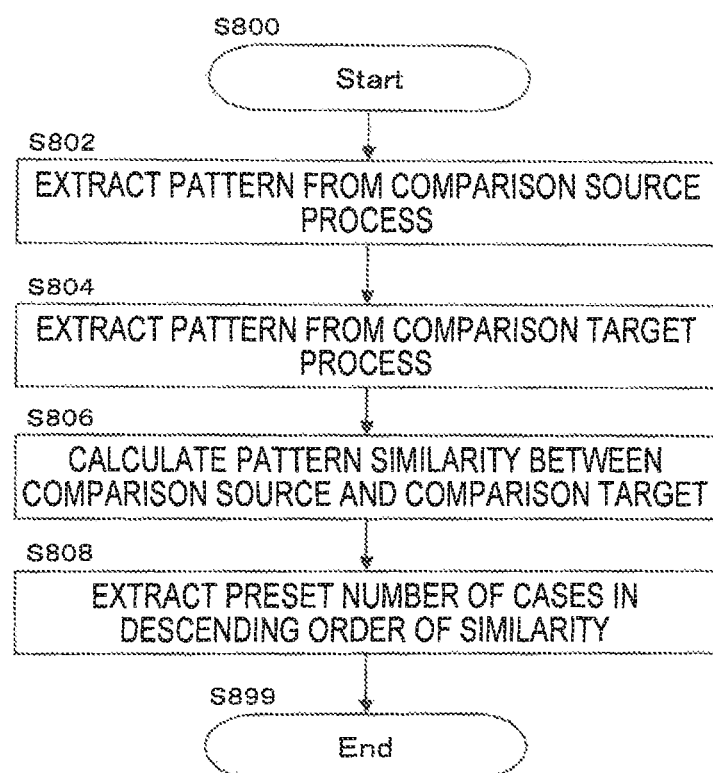
FIG. 8 is a flowchart illustrating a processing example according to the exemplary embodiment.

FIG. 8 is a flowchart illustrating a processing example (detailed example of the processing in step S708) according to the exemplary embodiment.

In step S802, a pattern is extracted from a comparison source process.

Figure 11:
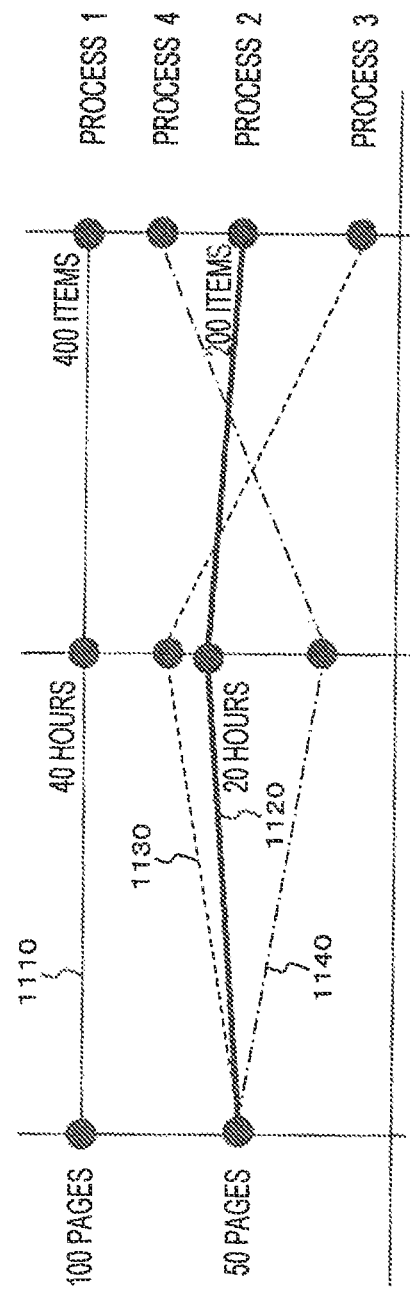
FIG. 11 is an explanatory view illustrating a processing example according to the exemplary embodiment.

In the above described example, a graph related to selected features (the number of pages, the operation time, and the number of items) is generated for the process 2. FIG. 11 is an explanatory view illustrating a processing example according to the exemplary embodiment. In the horizontal axis, features are arranged in the task order. A graph 1120 indicates "process 2."

In step S804, a pattern is extracted from a comparison target process.

The same graphs are generated for processes other than the process 2. In the example of FIG. 11, a graph 1110 indicates "process 1." A graph 1130 indicates "process 3." A graph 1140 indicates "process 4."

In step S806, a pattern similarity between the comparison source and the comparison target is calculated.

Here, the calculation of the similarity may be performed not only by using a related technology, but also by adding up, for example, differences (absolute values) for respective features, by adding up differences after giving weightings on respective features, or adding up differences in the graph shape (e.g., an angle of a broken line). In this example, in the graph shape, the graph 1120 and the graph 1110 are most similar to each other.

In step S808, a preset number of cases are extracted in descending order of similarity.

For example, processes from the highest similarity process to the process at the third place are extracted.

In step S710, a list of processes that are determined to be similar is presented.

For example, the screen 900 illustrated in FIG. 12 is presented. FIG. 12 is an explanatory view illustrating a processing example according to the exemplary embodiment. On the screen 900, an extraction result display area 1200 is presented.

The extraction result display area 1200 includes a process column 1210, a design>specification>number of pages column 1220, an implementation>operation time column 1230, a test>script>number of items column 1240, and a similarity column 1250. The process column 1210 presents a process. The design>specification>number of pages column 1220 presents the number of pages of "specification" in the "design" task. The implementation>operation time column 1230 presents an operation time of the "implementation" task. The test>script>number of items column 1240 presents the number of items of the script in the "test" task. The similarity column 1250 presents a similarity. This example indicates that the process 1 is similar to the process 2.

Figure 13:
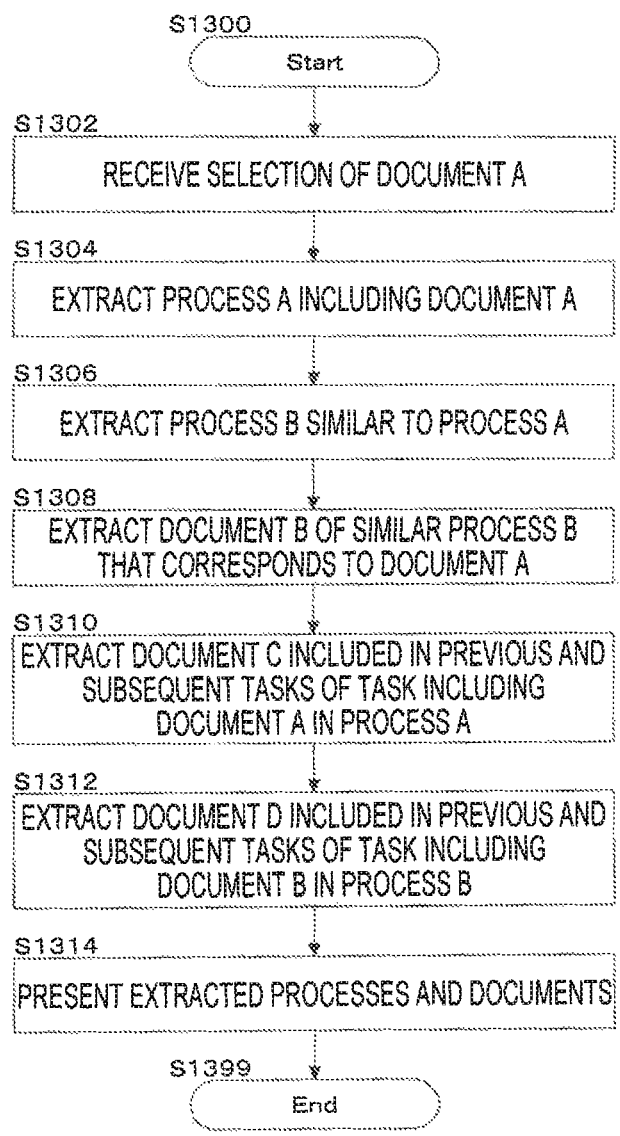
FIG. 13 is a flowchart illustrating a processing example according to the exemplary embodiment.

FIG. 13 is a flowchart illustrating a processing example according to the exemplary embodiment. A document managed by the document information management module 120 is specified by the user, and a process including a task related to the document, and a process similar to the process are presented. A related document may be retrieved via business process information starting from the document.

In step S1302, the selection of a document A is received. For example, the document is selected by the user operation.

In step S1304, a process A including the document A is extracted. For example, the process A related to the document A may be extracted by the process and document relationship table 600.

In step S1306, a process B similar to the process A is extracted. Here, as features used for calculating the similarity between processes, predetermined features (which may be all features) may be used, or features selected by the user operation may be used.

In step S1308, a document B of the similar process B that corresponds to the document A is extracted. The document B corresponding to the document A may be a document in association with the same task, or may be a document having the same predetermined features (e.g., a document type, a document name, and the like) as the document A.

In step S1310, a document C included in previous and subsequent tasks of a task including the document A in the process A is extracted. This is because there is a correlation in which the document C is a document used for creating the document A or a document created based on the document A.

In step S1312, a document D included in previous and subsequent tasks of a task including the document B in the process B is extracted. This is because there is a correlation in which the document D is a document used for creating the document B or a document created based on the document B.

In step S1314, processes and documents extracted in steps S1306, S1308, S1310, and S1312 are presented.

It should be noted that not all of steps S1306, S1308, S1310, and S1312, but only one or more of the steps may be performed.

FIGS. 14A and 14B are explanatory views each illustrating a processing example according to the exemplary embodiment.

For example, as illustrated in FIG. 14A, it is assumed that a specification 942 is selected.

As a result of the extraction processing, as illustrated in the example of FIG. 14B, presentation is made as follows.

a process having the specification 942 as a product: a process 2 a document of a previous task of a task in which the specification 942 is created: a proposal 932 a document of a subsequent task of a task in which the specification 942 is created: a code 952 a process similar to a process including the specification 942: a process 1 a document corresponding to the specification 942: a specification 941 a document of a previous task of a task in which the specification 941 corresponding to the specification 942 is created: a proposal 931 a document of a subsequent task of the task in which the specification 941 corresponding to the specification 942 is created: a code 951

FIG. 15 is an explanatory view illustrating a processing example according to the exemplary embodiment.

In a screen 1500, a process list 1510 is presented. The process list 1510 includes a process column 1520, a "planning" task column 1530, a "design" task column 1540, an "implementation" task column 1550, a "test" task column 1560, a "review" task column 1570, a "test result" task column 1580, and a "failure after market introduction" task column 1590. The "test result" task column 1580, and the "failure after market introduction" task column 1590 are added to the process list 910 illustrated in the example of FIG. 9. That is, descriptions will be made on a processing in the case where there are tasks for evaluating a process (the "test result" task column 1580, and the "failure after market introduction" task column 1590).

Figure 16:
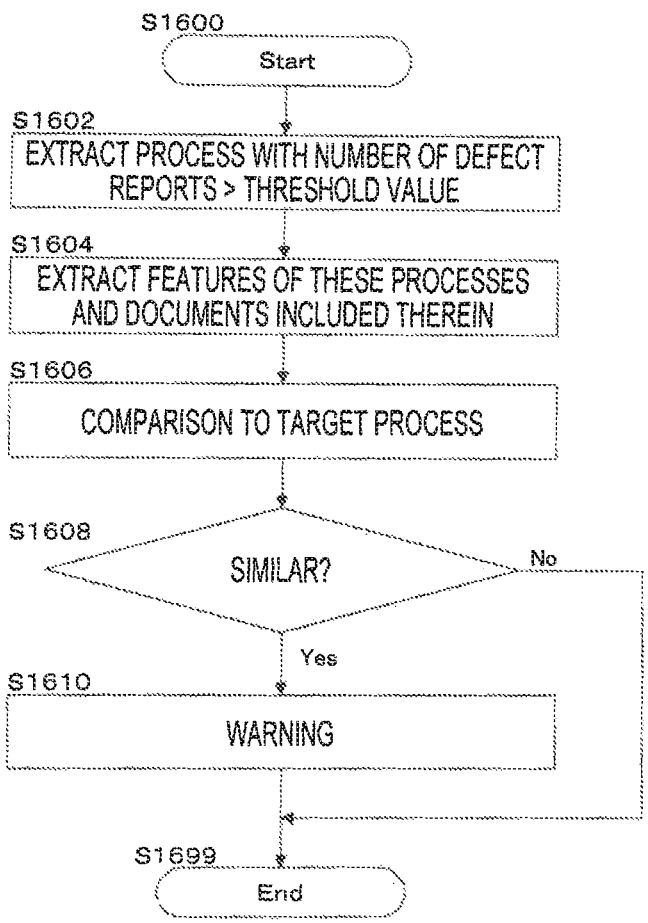
FIG. 16 is a flowchart illustrating a processing example according to the exemplary embodiment.

FIG. 16 is a flowchart illustrating a processing example according to the exemplary embodiment. The drawing illustrates a processing example when a process which tends to cause worsening results is detected using a process group having bad results, and a warning is issued.

In step S1602, a process with the number of defect reports>a threshold value is extracted. The number of defect reports is a feature extractable from documents associated with the "test result" task column 1580 and the "failure after market introduction" task column 1590 (a test result 1581, a defect report 1591 and the like). Specifically, the number of defect reports may be extracted from the documents through parsing. This is performed on a process that has already ended.

In step S1604, features of these processes and documents included therein are extracted. Here, the features may be predetermined features, or may be selected by the user.

In step S1606, a comparison to a target process is made. The "target process" is a process (a process in progress) which has not yet been completed. The comparison is performed by calculating the similarity between processes as described above.

In step S1608, it is determined whether they are similar to each other. When it is determined that they are similar to each other, the processing proceeds to step S1610. Otherwise, the processing ends (step S1699).

In step S1610, a warning is issued. Since the target process is similar to the process having a bad evaluation (that is, a process with the "number of defect reports>the threshold value"), there is a high possibility that the target process may have the "number of defect reports>the threshold value." Thus, a warning may be sent to the person in charge of the process, or the like via e-mail or the like (which may include text display, output of audio or the like, vibration or the like).

The warning may be made when the target process is not similar to a process group having good results (that is, a process with the "number of defect reports<the threshold value").

Figure 17:
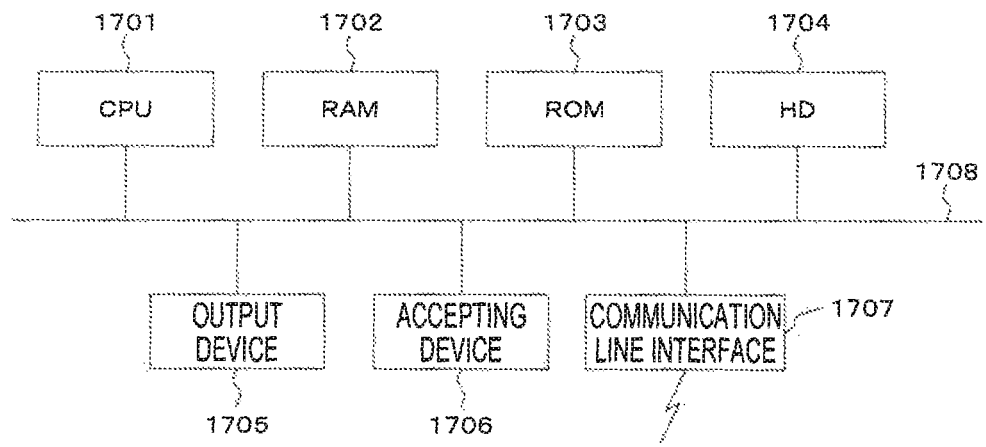
FIG. 17 is a block diagram illustrating a hardware configuration example of a computer that implements the exemplary embodiment.

A hardware configuration of a computer in which the program according to the exemplary embodiment is executed corresponds to a general computer, specifically, a personal computer, a computer to be used as a server, or the like, as exemplified in FIG. 17. That is, as a specific example, a CPU 1701 is used as a processor (arithmetic unit), and a RAM 1702, a ROM 1703, and a HD 1704 are used as storage devices. As the HD 1704, for example, a hard disk, or solid state drive (SSD) may be used. The configuration includes: the CPU 1701 configured to execute programs such as the information processing module 130, the related process extraction module 135, the pattern generating module 140, the similarity extraction module 145, the document feature information extraction module 150, the user interface module 155, the process and document information presentation module 160, and the information-of-interest instruction module 165; the RAM 1702 configured to store the programs or data; the ROM 1703 in which a program for activating the computer is stored; the HD 1704 that is an auxiliary storage device (e.g., a flash memory) having functions as the information management module 110, the process information management module 115, the document information management module 120, and the process document relationship information management module 125; an accepting device 1706 configured to accept data based on an operation on a keyboard, a mouse, a touch screen, a microphone, or the like by a user; an output device 1705 such as a CRT, a liquid crystal display, and a speaker; a communication line interface 1707 configured to connect with a communication network such as a network interface card; and a bus 1708 configured to connect these components to exchange data. Plural computers configured as described above may be connected to each other via a network.

In the above described exemplary embodiment, in relation to a computer program, the computer program as software is read in the hardware configuration system, and the software and hardware resources cooperate with each other, thereby implementing the above described exemplary embodiment.

In the hardware configuration illustrated in FIG. 17, one configuration example is illustrated. However, the configuration according to the exemplary embodiment is not limited to that illustrated in FIG. 17 as long as the configuration allows modules described for the exemplary embodiment to be executed. For example, some modules may be constituted by dedicated hardware (e.g., an application specific integrated circuit (ASIC)), and other modules may be connected via a communication line in an external system. Further, plural systems illustrated in FIG. 17 may be connected to each other via a communication line so as to cooperate with each other. Particularly, the configuration may be incorporated in not only a personal computer, but also in a portable information communication device (including a mobile phone, a smart phone, a mobile device, a wearable computer and the like), an information appliance, a robot, a copier, a facsimile, a scanner, a printer, a multifunction device (an image processing apparatus having two or more functions among a scanner, a printer, a copier, and a facsimile, etc.) and the like.

The above described program may be provided while being stored in a recording medium, or may be provided by a communication unit. In such a case, for example, the above described program may be regarded as an invention of a "computer-readable recording medium in which a program is recorded."

The "computer-readable recording medium in which a program is recorded" refers to a computer-readable recording medium in which a program used for installing, executing, and distributing programs is recorded.

Examples of the recording medium may include a digital versatile disc (DVD) such as "DVD-R, DVD-RW, DVD-RAM, etc." (standards established by a DVD forum) and "DVD+R, DVD+RW, etc." (standards established by DVD+RW), a compact disc (CD) such as a CD read-only memory (CD-ROM), a CD recordable (CD-R), and a CD re-writable (CD-RW), a Blu-ray (registered trademark) disc, a magneto-optical disc (MO), a flexible disk (FD), a magnetic tape, a hard disk, a read only memory (ROM), an electrically erasable and rewritable read-only memory (EEPROM (registered trademark)), a flash memory, a random access memory (RAM), and a secure digital (SD) memory card.

The entire or a part of the above described program may be stored or circulated while being recorded in the above described recording medium. Alternatively, the program may be transmitted through a communication such as, for example, via a wired network or a wireless communication network used for a local area network (LAN), a metropolitan area network (MAN), a wide area network (WAN), the Internet, an intranet, an extranet and the like, and a transmission medium such as a combination thereof. Alternatively, the program may be carried on a carrier wave.

The program may be a part or the entire of another program, or may be recorded in a recording medium together with a separate program. The program may be divided and recorded in plural recording media. The program may be recorded in any form such as a compressed form or an encrypted form so long as it can be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to:
   receive an input from a user selecting (i) one or more task features that are features in tasks of a first business process and (ii) one or more document features that are features of documents generated in the tasks of the first business process;
   extract a first pattern of quantifiable values of the selected one or more task features and the selected one or more document features of the first business process;
   extract a second pattern of quantifiable values of corresponding one or more task features and corresponding one or more document features of a second business process different from the first business process,
   the first pattern and the second pattern being graphs generated in a coordinate having (i) one axis representing the selected task features and the selected document features in the first business process and their corresponding features in the second business process, and (ii) another axis representing quantifiable values for (i);
   determine a degree of similarity between the first pattern and the second pattern by comparing the quantifiable values of the selected task features and the selected document features in the first business process and the quantifiable values of their corresponding features in the second business process; and
   based on the determined degree of similarity, present, on a display, a search result including the second business process.

2. The information processing apparatus according to claim 1, wherein the processor is programmed to:
   perform a search of the second business process as a search target using the first business process as a search condition, the search being performed by comparing a pattern in which the selected one or more task features and the selected one or more document features are arranged in the first business process to a pattern in which the corresponding one or more task features and the corresponding one or more document features are arranged in another business process.

3. The information processing apparatus according to claim 1, wherein the processor is programmed to:
   perform a search of the second business process as a search target by using the selected one or more task features and the selected one or more document features of the first business process as a search condition.

4. The information processing apparatus according to claim 1, wherein the processor is programmed to:
   receive a user selection of a document generated in the first business process; and
   perform a search of the second business process as a search target by using document features of the selected document as a search condition.

5. The information processing apparatus according to claim 1, wherein the processor is programmed to:
   extract a business process whose evaluation falls within a predetermined range; and
   issue a warning when task features and document features of the extracted business process are similar to task features and document feature of the second business process presented as the search result.

6. An information processing method performed by a computer, the method comprising:
   receiving an input from a user selecting (i) one or more task features that are features in tasks of a first business process and (ii) one or more document features that are features of documents generated in the tasks of the first business process;
   extracting a first pattern of quantifiable values of the selected one or more task features and the selected one or more document features of the first business process;
   extracting a second pattern of quantifiable values of corresponding one or more task features and corresponding one or more document features of a second business process different from the first business process,
   the first pattern and the second pattern being graphs generated in a coordinate having (i) one axis representing the selected task features and the selected document features in the first business process and their corresponding features in the second business process, and (ii) another axis representing quantifiable values for (i);
   determining a degree of similarity between the first pattern and the second pattern by comparing the quantifiable values of the selected task features and the selected document features in the first business process and the quantifiable values of their corresponding features in the second business process; and
   based on the determined degree of similarity, presenting, on a display, a search result including the second business process.

7. A non-transitory computer readable medium storing a program causing a computer to execute information processing comprising:
   receiving an input from a user selecting (i) one or more task features that are features in tasks of a first business process and (ii) one or more document features that are features of documents generated in the tasks of the first business process;
   extracting a first pattern of quantifiable values of the selected one or more task features and the selected one or more document features of the first business process;
   extracting a second pattern of quantifiable values of corresponding one or more task features and corresponding one or more document features of a second business process different from the first business process, the first pattern and the second pattern being graphs generated in a coordinate having (i) one axis representing the selected task features and the selected document features in the first business process and their corresponding features in the second business process, and (ii) another axis representing quantifiable values for (i);

determining a degree of similarity between the first pattern and the second pattern by comparing the quantifiable values of the selected task features and the selected document features in the first business process and the quantifiable values of their corresponding features in the second business process; and based on the determined degree of similarity, presenting, on a display, a search result including the second business process.

8. The information processing apparatus according to claim 1, wherein the processor is programmed to:

generate a first graph representing the first pattern;

generate a second graph representing the second pattern; and determine the degree of similarity between the first pattern and the second pattern based on a degree of similarity between the first graph and the second graph.

9. The information processing apparatus according to claim 1, wherein the processor is programmed to:

extract a plurality of patterns of respective quantifiable values of corresponding one or more task features and corresponding one or more document features of each of a plurality of business processes different from the first business process;

determine a degree of similarity between (i) each of the plurality of patterns and (ii) the first pattern; and present, on the display, the plurality of business processes in a descending order of the degree of similarity between each of the plurality of patterns and the first pattern.

10. The information processing apparatus according to claim 1, wherein the processor is programmed to:

present, on the display, a list of (i) a plurality of business processes including the first business process and the second business process, (ii) respective quantifiable values of corresponding one or more task features and corresponding one or more document features for each of the plurality of business processes, and (iii) a respective degree of similarity to the first pattern for each of the plurality of business processes, with the first business process being indicated as a comparison source.

* * * * *